United States Patent Office 2,968,654
Patented Jan. 17, 1961

2,968,654

ALLO PREGNANE COMPOUNDS AND PROCESS

Carl Djerassi, Birmingham, Mich., and George Rosenkranz, Mexico City, Mexico, assignors, by mesne assignments, to Syntex S.A., Mexico City, Mexico, a corporation of Mexico No Drawing. Original application Sept. 3, 1952, Ser. No. 307,722, now Patent No. 2,773,079, dated Dec. 4, 1956. Divided and this application Oct. 3, 1956, Ser. No. 616,904

Claims priority, application Mexico Sept. 20, 1951

8 Claims. (Cl. 260—239.55)

The present invention relates to novel cyclopentanophenanthrene derivatives and to a method for the preparation thereof. More particularly, the present invention relates to certain novel intermediates useful for the preparation of allopregnane-17α,21-diol-3,11,20-trione (dihydroallocortisone) which can be readily converted to cortisone in accordance with our United States application, Serial Number 218,095, filed March 28, 1951, and to a novel process for the preparation thereof.

In our United States application, Serial Number 291,556, filed June 3, 1952, there is disclosed a method for the preparation of 3β,11α-dihydroxy sapogenins from a Δ⁸-sapogenin such as Δ⁸-22-isoallospirostene-3β,11α-diol-7-one.

In accordance with the present invention we have discovered that compounds of the type just referred to, as for example, 22-isoallospirostan-3β,11α-diol may be converted into the corresponding triacetate of $\Delta^{20(22)}$-furostene-3β,11α,26-triol which on oxidation with chromic anhydride under the conditions set forth in our United States application, Serial Number 287,821, filed May 14, 1952, can be degraded to $\Delta^{16}$-allopregnene-3β,11α-diol diacetate.

It has been further discovered, in accordance with the present invention, that hydrogenation of the 16—17 double bond of the last mentioned compound gives a corresponding saturated allopregnane compound and that this compound may be readily converted as hereinafter set forth in to the corresponding allopregnane-3β,11α,17α-triol-20-one.

It has further been discovered in accordance with the present invention, that the last mentioned triol may be converted in to allopregnan-3β,17α-diol-11,20-dione which may readily be converted in to dihydroallocortisone as has already been described in the application of Rosenkranz, Pataki and Djerassi, Serial Number 288,311, filed May 16, 1952. In the alternative, the allopregnantriolone can be brominated with one mol of bromine to give the corresponding 21-bromo derivative which is thereafter converted in to the 21-monoacetate which may thereafter be oxidized with a mild oxidizing agent to form dihydroallocortisone.

The production of allopregnan-3β,11α,17α-triol-20-one from 22-isoallospirostan-3β,11α-diol may be illustrated by the following formula:

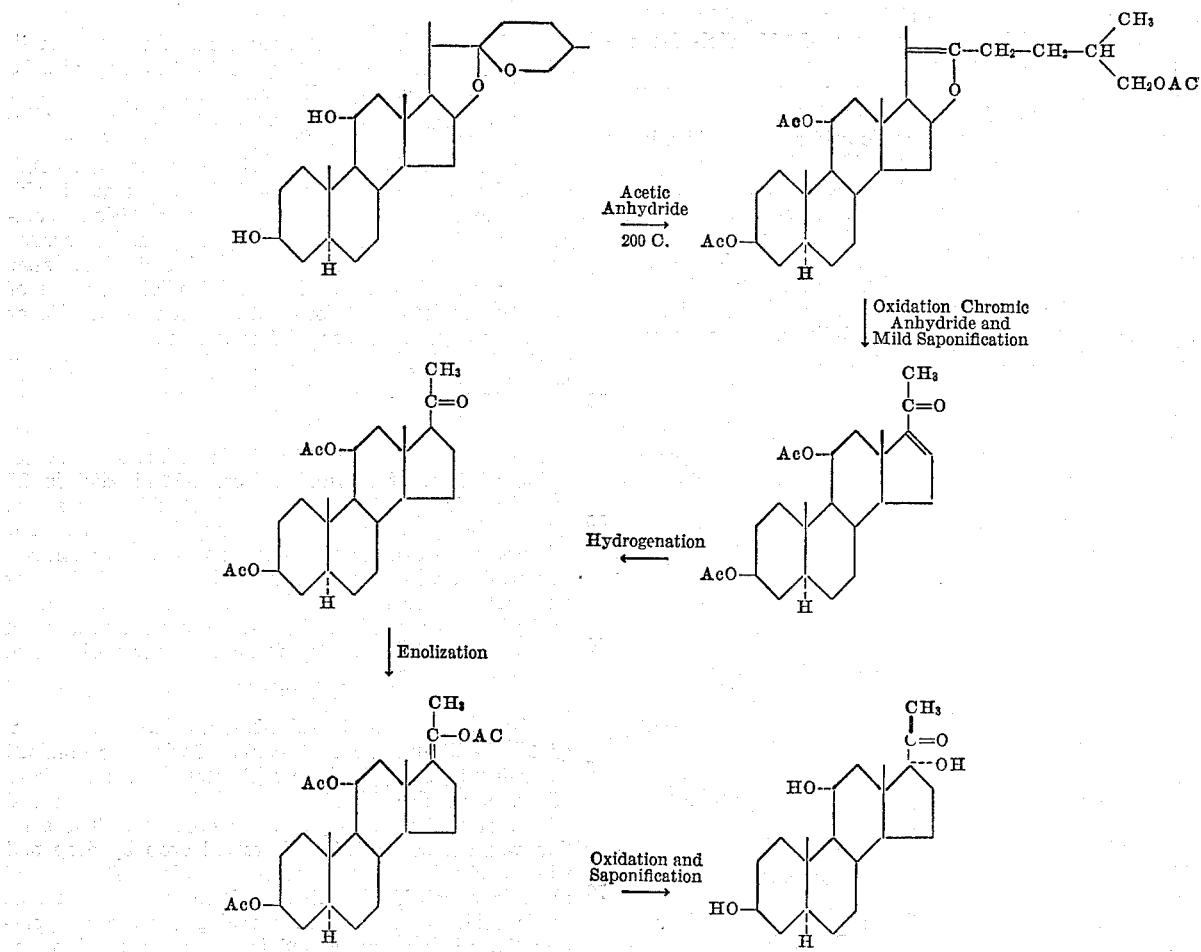

In the foregoing equation AC represents an acetoxy group although it may be understood that it may represent other lower fatty acid groups depending on the type of anhydride utilized in the reaction.

In practicing the reaction above outlined the sapogenin, i.e., 22-isoallospirostan-3β,11α-diol is dissolved in a suitable lower fatty acid anhydride such as acetic anhydride and heated in a sealed tube at a temperature of approximately 200 C., for a relatively long period of time such as 8 hours. Thereafter it is poured into water, purified and evaporated to dryness to give an oily residue. The oily residue of the step just referred to is then dissolved in a lower fatty acid such as acetic acid together with an organic solvent such as ethylene dichloride and a small amount of water with heating until all of the oil is dissolved. The solution is cooled to below room temperature as for example 15 C., and treated slowly with stirring with a solution of chromic anhydride in acetic acid together with a small amount of water. The mixture is allowed to stand for a short period of time as for example 2 hours and the ethylene dichloride layer separated by decantation. The aqueous layer is then extracted with a suitable solvent such as chloroform and the ethylene dichloride solution and chloroform solution is purified and combined. After evaporation the residue is dissolved in a mixed solvent such as benzene and hexane and chromatographed in an alumina column. The alumina causes a mild saponification and the product is $\Delta^{16}$-allopregnene-3β,11α-diol-20-one diacetate.

The $\Delta^{16}$ compound is then hydrogenated as by shaking with hydrogen at room temperature and pressure together with a hydrogenation catalyst such as 10% palladium on barium sulphate. When the absorption of hydrogen ceased, i.e., in approximately 1 hour, the catalyst is filtered off and the solution evaporated to dryness. The residue on recrystallization gave allopregnane-3β,11α-diol-20-one diacetate. From the diacetate of the previous step the corresponding 17α-triol compound could then be prepared by enolizing the allopregnan-3β,11α-diol-20-one diacetate as with a lower fatty acid anhydride such as acetic anhydride in the presence of a catalyst such as p-toluenesulphonic acid followed by oxidation with an aromatic per acid such as perbenzoic acid and saponification of the oxidation product under mild conditions, i.e., room temperature or below with methanolic alkali metal hydroxide such as sodium hydroxide. The resultant product, allopregnane-3β,11α,17α-triol-20-one may then be treated with a mild oxidizing agent to form allopregnan-3,11,20-trione-17α-ol which can be selectively hydrogenated as with Raney nickel catalyst in alcohol solution to form allopregnan-3β,17α-diol-11,20-dione. This process is outlined in the following equations:

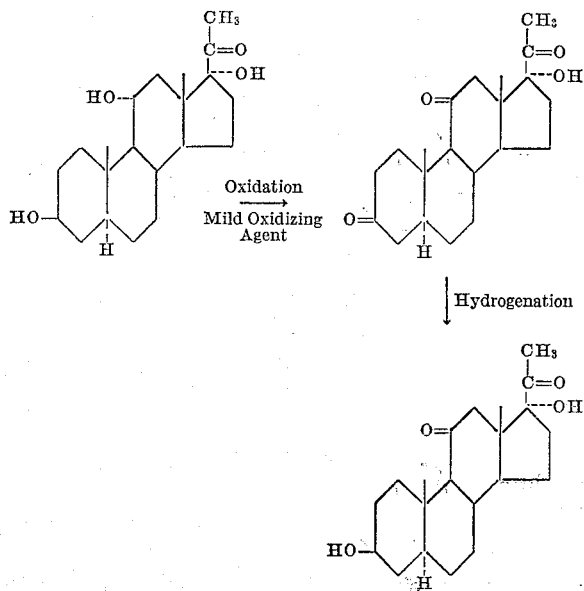

The mild oxidizing agent indicated above may be an N-halo-acid amide preferably in pyridine such as N-bromoacetamide or N-bromosuccinimide. In the alternative two equivalents (1.32 mols) of chromic anhydride may be used under mild conditions. The resultant product of the above reaction is allopregnan-3β,17α-diol-11,20-dione which, as previously set forth, may be converted in to dihydroallocortisone.

Allopregnan-3β,11α,17α-triol-20-one may also be converted in to dihydroallocortisone as exemplified by the following equation:

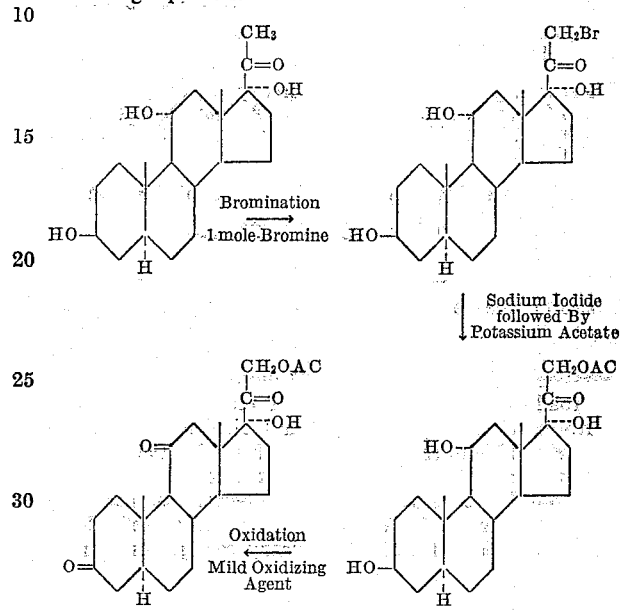

In the above equation AC represents the acetate radical, although other lower fatty acid esters may also be formed by the corresponding reagents.

In practicing the process steps above outlined the allopregnane-3β,11α,17α-triol-20-one is dissolved in a suitable solvent and monobrominated to give the corresponding 21-bromo derivative which is in turn reacted with sodium iodide to give the corresponding 21-iodo compound which may be transformed with potassium acetate into the 21-monoacetate as above indicated. Thereafter the 21-acetate is treated with a mild oxidizing agent of the type previously set forth, i.e., N-bromoacetamide or chromic anhydride under mild conditions.

The following examples serve to illustrate the present invention but are not intended to limit same:

*Example I*

$\Delta^{20(22)}$-allofurostene-3β,11α,26-triol triacetate. A solution of 5 g. of 22-isoallospirostan-3β,11α-diol in 20 cc. of acetic anhydride was heated at 196° in a sealed tube during 8 hours and then poured in water. The mixture was extracted with ether and the ether solution was washed with water, sodium bicarbonate and water until neutral, dried over sodium sulphate and evaporated to dryness. 4.6 g. of an oily residue was obtained which was used for the next step without further purification.

*Example II*

$\Delta^{16}$-allopregnene-3β,11α-diol-20-one diacetate. 4.6 g. of $\Delta^{20(22)}$-allofurostene-3β,11α,26-triol triacetate obtained according to Example I were dissolved in a mixture of 45 cc. of acetic acid, 36 cc. of ethylene dichloride and 15 cc. of water, heating until all dissolved. The solution was cooled to 15° and treated drop by drop and with mechanical stirring with a solution of 1.4 g. of chromic anhydride in 2.2 cc. of water and 22 cc. of acetic acid. After 2 hours standing at room temperature the mixture was poured in water and the layer of ethylene dichloride was separated by decantation. The aqueous layer was extracted with chloroform and the combined chloroform and ethylene dichloride solution was washed several times with water, dried over sodium sulphate and evaporated to dryness. The residue was dissolved in a mixture of 50 cc. of benzene and 200 cc. of hexane and chromatographed in a column with 250 g. of alumina. The fractions eluted with benzene-ether (30:20 and 40:10) were combined and evaporated to dryness. The residue crystallized upon digestion with a mixture ether-pentane to yield 1.6 g. of $\Delta^{16}$-allopregnene-3$\beta$,11$\alpha$-diol-20-one diacetate having ultraviolet absorption maximum at 238 $\mu$ (log $\epsilon$ 4.12).

*Example III*

Allopregnane-3$\beta$,11$\alpha$-diol-20-one diacetate. A solution of 600 mg. of $\Delta^{16}$-allopregnene-3$\beta$,11$\alpha$-diol-20-one diacetate in 100 cc. of ethyl acetate was shaken at room temperature and atmospheric pressure under an atmosphere of hydrogen with 115 mg. of 10% palladium on barium sulphate catalyst. The absorption of hydrogen ceased after one hour. The catalyst was filtered and the solution was evaporated to dryness and the residue was crystallized from hexane-acetone to give 510 mg. of allopregan-3$\beta$,11$\alpha$-diol-20-one diacetate, which in contrast to the starting material, showed no selective absorption in the ultraviolet spectrum. Conventional saponification gave the free compound.

*Example IV*

Allopregnan-3$\beta$,11$\alpha$,17$\alpha$-triol-20-one. A solution of 2 g. of allopregnan-3$\beta$,11$\alpha$-diol-20-one diacetate and 1 g. of p-toluenesulphonic acid in 170 cc. of acetic anhydride was slowly concentrated to a volume of 20 cc. in the course of 5 hours and then it was poured in ice water containing 3 cc. of pyridine. The product was extracted with ether, washed with 2% sodium hydroxide and water until neutral, dried over sodium sulphate and evaporated to dryness. The residue was dissolved in hexane and passed through a column of washed alumina in order to eliminate impurities. The solution was concentrated to dryness to leave 2.15 g. of $\Delta^{17(20)}$-allopregnene-3$\beta$,11$\alpha$,20-triol triacetate which was not crystallized but directly dissolved in 20 cc. of chloroform and let to react during 40 hours at room temperature with 13 cc. of a chloroform solution of perbenzoic acid containing 63 mg. of acid per cc. The mixture was diluted with more chloroform and washed with sodium iodide, sodium thiosulphate, sodium carbonate and water, and concentrated to a small volume. The solution was then treated during 30 minutes at room temperature with 1 g. of sodium hydroxide in 100 cc. of methanol. After neutralizing with acetic acid the solution was concentrated to 30 cc. and diluted with water to obtain complete precipitation. The precipitate was collected and crystallized from ether containing a small amount of hexane, yielding 1.35 g. of allopregnan-3$\beta$,11$\alpha$,17$\alpha$-triol-20-one having a melting point of 253°–255° C., $(\alpha)_D^{20}$ —46° (chloroform).

*Example V*

Allopregnan-17$\alpha$-ol-3,11,20-trione. *Method A.* A solution of 113 mg. (1.32 mol) of chromic anhydride in 5 cc. of acetic acid and 0.5 cc. of water was added drop by drop to a stirred solution of 300 mg. of allopregnan-3$\beta$,11$\alpha$,17$\alpha$-triol-20-one in 20 cc. of acetic acid maintained at 15°. After 5 hours standing, the mixture was poured in water and the precipitate extracted with ether. The ether solution was washed until neutral and concentrated until crystallization started. After cooling the mixture, 150 mg. of crystalline allopregnan-17$\alpha$-ol-3,11,20-trione was obtained.

*Method B.*—550 mg. of N-bromoacetamide were added to a solution of 300 mg. of allopregnan-3$\beta$,11$\alpha$,17$\alpha$-triol-20-one in 6 cc. of pyridine. After 40 hours standing at room temperature, the solution was diluted with 70 cc. of 1% hydrochloric acid. The precipitate was collected, washed, dried and recrystallized from ethyl acetate to give 255 mg. of allopregnan-17$\alpha$-ol-3,11,20-trione identical to the one obtained according to Method A.

*Example VI*

Allopregnan-3$\beta$,17$\alpha$-diol-11,20-dione. A solution of of 200 mg. of allopregnan-17$\alpha$-ol-3,11,20-trione in 20 cc. of ethanol was shaken at room temperature and atmospheric pressure under an atmosphere of hydrogen in the presence of 2 g. of previously reduced Raney nickel catalyst. After 1 hour the catalyst was filtered and the solution was evaporated to dryness. The residue crystallized from ether-hexane to yield 185 mg. of allopregnan-3$\beta$,17$\alpha$-diol-11,20-dione with a melting point of 270°–272° C.

*Example VII*

21-bromo-allopregnane-3$\beta$,17$\alpha$,17$\alpha$-triol-20-one. A solution of 0.7 g. of bromine in 7 cc. of chloroform was slowly added to a stirred solution of 1.5 g. of allopregnan-3$\beta$,11$\alpha$,17$\alpha$-triol-20-one in 15 cc. of chloroform (no hydrobromic acid was added). After adding all the bromine, the solution was diluted with chloroform and well ashed with water, dried over sodium sulphate and concentrated in vacuum at a temperature below 40°. The residue crystallized from chloroform-ether to give 1.6 g. of 21-bromo-allopregnane-3$\beta$,11$\alpha$,17$\alpha$-triol-20-one.

*Example VIII*

Allopregnane- 3$\beta$,11$\alpha$,17$\alpha$,21-tetrol-20-one 21-monoacetate. Without further purification, the bromo compound obtained according to Example VII was dissolved in 40 cc. of acetone and mixed with a solution of 1 g. of sodium iodide in 10 cc. of acetone. After refluxing for 10 minutes, the solution was filtered to remove the sodium bromide which had formed. The solution was diluted with hexane to a volume of 80 cc., mixed with a mixture of 7.5 g. of potassium bicarbonate and 4.5 cc. of acetic acid and the whole was refluxed during 10 hours. The mixture was concentrated to a volume of 20 cc., diluted with water and the precipitate formed was collected. After washing and drying, the precipitate was recrystallized from hexane-acetone, yielding 1.1 of allopregnan-3$\beta$,11$\alpha$,17$\alpha$,21-tetrol-20-one 21-monoacetate.

*Example IX*

Allopregnane-17$\alpha$,21-diol-3,11,20-trione 21-acetate (dihydroallocortisone acetate). *Method A.* A solution of 101 mg. of chromic anhydride in 5 cc. of acetic acid and 0.5 cc. of water was added drop by drop to a mechanically stirred solution of 300 mg. of allopregnan-3$\beta$,11$\alpha$,17$\alpha$,21-tetrol-20-one 21-acetate in 20 cc. of acetic acid, at room temperature. After standing 16 hours, the mixture was poured in water and the precipitate extracted with ether. The other solution was washed to neutrality, dried over sodium sulphate and concentrated until crystallization started. After cooling, the precipitate was collected to give 147 mg. of crystalline allopregnane-17$\alpha$,21-diol-3,11,20-trione 21-acetate, melting point 234°–237° C.

*Method B.*—620 mg. of N-bromoacetamide were added at room temperature to a solution of 300 mg. of allopregnane-3$\beta$,11$\alpha$,17$\alpha$,21-tetrol-20-one 21-acetate in 6 cc. of pyridine. After 48 hours the mixture was diluted with 70 cc. of 1% hydrochloric acid and the precipitate was filtered, washed, dried and recrystallized from ethyl acetate to give 263 mg. of allopregnane-17$\alpha$,21-diol-3,11,20-trione acetate, identical to the one obtained according to Method A.

The present application is a division of application Serial No. 307,722, filed September 3, 1952, now Patent No. 2,773,079, granted December 4, 1956.

We claim:

1. A process for the preparation of $\Delta^{20(22)}$-allofurostene-3$\beta$,11$\alpha$,26-triol triacetate which comprises treating 22-isoallospirostan-3$\beta$,11$\alpha$-diol with acetic anhydride under pressure at a temperature of approximately 200° C.

2. A process for the preparation of $\Delta^{16}$-allopregnene-3β,11α-diol-20-one diacetate which comprises oxidizing $\Delta^{20(22)}$ - allofurostene - 3β,11α,26 - triol triacetate with chromic anhydride in acetic acid and thereafter saponifying the oxidation product with alumina.

3. A process for the preparation of allopregnane-17α-ol-3,11,20-trione which comprises oxidizing allopregnane-3β,11α,17α-triol-20-one with chromic anhydride.

4. A process for the preparation of allopregnane-3β,17α-diol-11,20-dione which comprises selectively hydrogenating allopregnane-17α-ol-3,11,20-trione in the presence of a previously reduced Raney nickel catalyst.

5. A process for the preparation of allopregnane-17α,21-diol-3,11,20-trione 21-acetate which comprises oxidizing allopregnane-3β,11α,17α,21-tetrol-20-one 21-acetate with chromic anhydride.

6. A new compound consisting of $\Delta^{20(22)}$-allofurostene-3β,11α,26-triol triacetate.

7. A new compound consisting of $\Delta^{16}$-allopregnene-3β,11α-diol-20-one diacetate.

8. A new compound consisting of allopregnane-3β,11α-diol-20-one diacetate.

References Cited in the file of this patent
UNITED STATES PATENTS

| | | |
|---|---|---|
| 2,352,852 | Marker | July 4, 1944 |
| 2,656,364 | Hershberg | Oct. 20, 1953 |

OTHER REFERENCES

J.A.C.S., vol. 68, pages 2478–83 (1946), by Sarett.
Chamberlin: J.A.C.S. 73 (1951), 4052–4053.
Rosenkranz: J.A.C.S. 73 (1951), 4055–4056.